United States Patent [19]

Prochnow

[11] 4,019,041
[45] Apr. 19, 1977

[54] FLASH APPARATUS WITH CABLE STORAGE SPACE

[75] Inventor: Claus Prochnow, Braunschweig, Germany

[73] Assignee: Rollei-Werke Franke & Heidecke, Braunschweig, Germany

[22] Filed: Sept. 16, 1975

[21] Appl. No.: 613,760

[30] Foreign Application Priority Data

Sept. 28, 1974 Germany .......................... 2446411

[52] U.S. Cl. ................................. 240/1.3; 240/41.6
[51] Int. Cl.² ...................... G03B 15/02; F21V 7/00
[58] Field of Search ............ 240/1.3; 354/292, 127, 354/126

[56] References Cited

UNITED STATES PATENTS

| | | | |
|---|---|---|---|
| 2,688,071 | 8/1954 | Wright | 240/1.3 |
| 3,107,862 | 10/1963 | Moore et al. | 240/1.3 |
| 3,146,984 | 9/1964 | Matthews | 354/293 |
| 3,325,635 | 6/1967 | Wagner et al. | 240/1.3 |
| 3,751,652 | 8/1973 | Peterson et al. | 240/1.3 |

*Primary Examiner*—Stephen J. Tomsky
*Attorney, Agent, or Firm*—Stonebraker, Shepard & Stephens

[57] ABSTRACT

Photographic flash apparatus having a body provided with a cavity for storage of the synchronizing cable, and a mounting bar or rail pivoted to the body in such a way that in one position of the mounting bar, it forms a closure for the cable storage cavity, and other positions of the mounting bar enable the bar to be attached to the camera and enable the body of the flash apparatus to be swung to either one of two positions relative to the mounting bar. Releaseable latch means holds the mounting bar in the selected one of its various positions relative to the flash apparatus.

10 Claims, 6 Drawing Figures

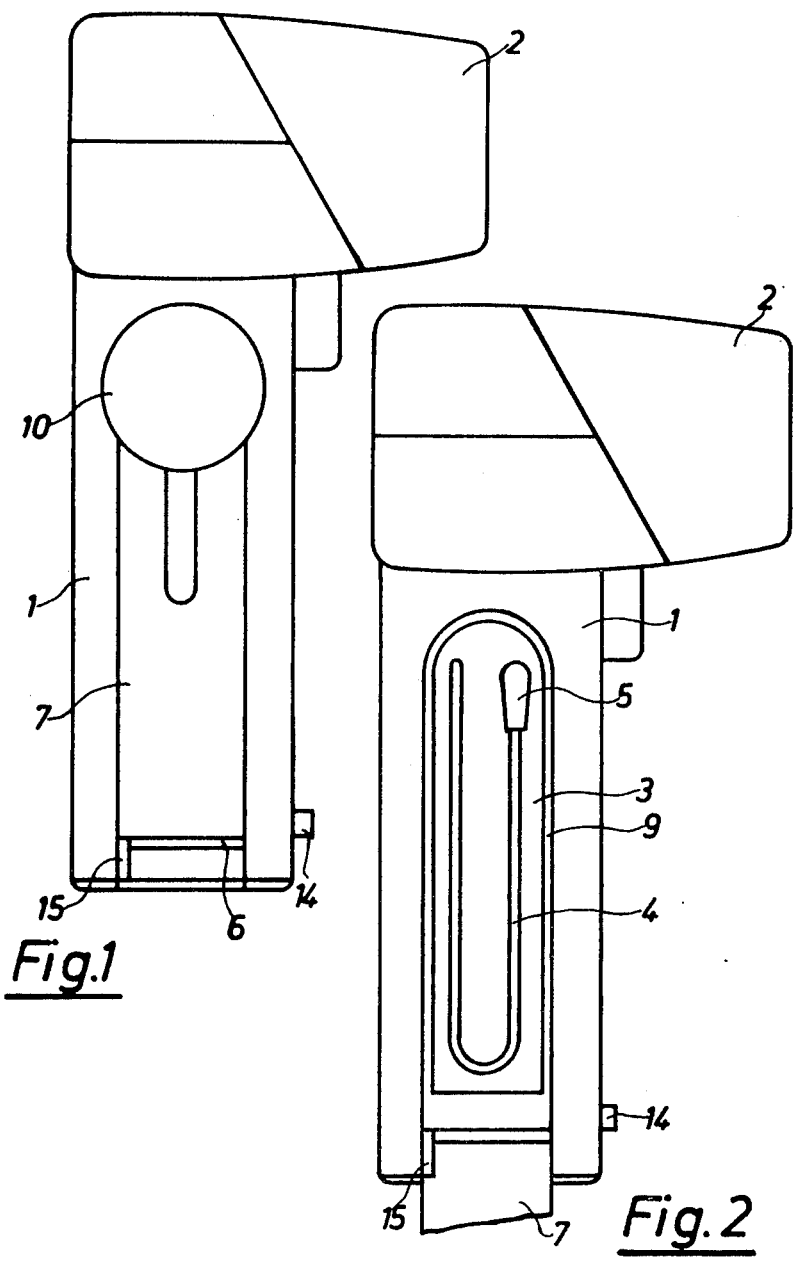

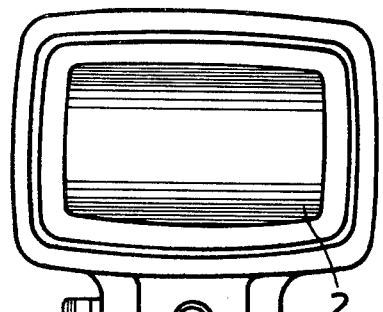
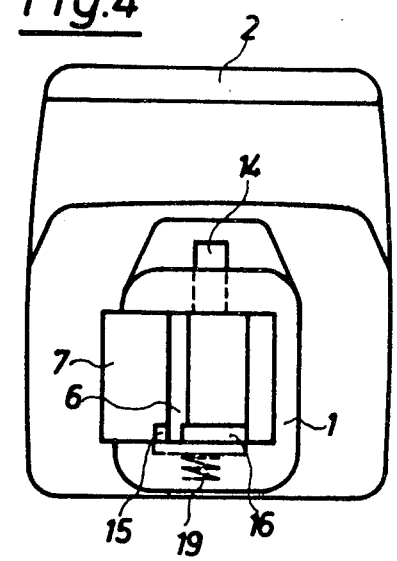
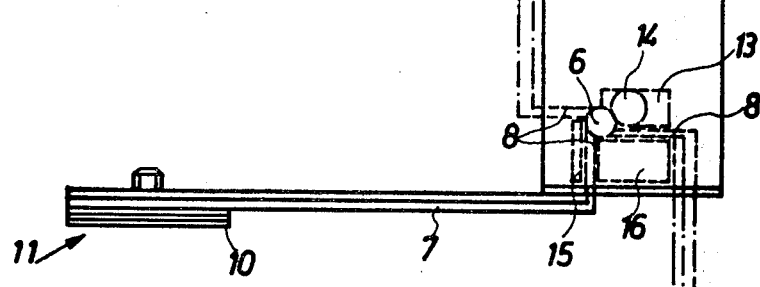

FLASH APPARATUS WITH CABLE STORAGE SPACE

BACKGROUND OF THE INVENTION

This invention relates to photographic flash apparatus of the type mountable on a camera by means of a mounting bar or rail, and having a conducting cable to connect the electric circuit of the flash apparatus to the conventional synchronizer switch in the camera with which the apparatus is used. In the prior art, the mounting bar or rail has usually been a separate piece, detachably connectable both to the flash apparatus and the camera, and the conducting cable also has customarily been separate, plugged into both the flash apparatus and the camera when in use. This usual arrangement familiar in the prior art has meant that it is necessary, when moving from one location to another, to handle three separate pieces of equipment, the flash device, the mounting bar or rail, and the cable, with consequent danger that one or another of the minor pieces (the mounting bar and the cable) may be accidentally overlooked and left behind. In some instances the cable has been permanently connected at one end to the flash apparatus, leaving only one loose end to be plugged into the camera. Although this arrangement obviates the danger of accidentally leaving the cable behind, nevertheless the plug end of the cable has been exposed during transportation, with danger that the plug connection may be bent or crushed or otherwise damaged so that it can no longer be used.

SUMMARY OF THE INVENTION

The above mentioned difficulties are overcome according to the present invention, by providing a cavity or space in the flash apparatus, for storage of the connecting cable when not in use, and by permanently attaching the mounting bar or rail to the flash apparatus, by means of a hinge so arranged that the mounting bar may swing to various positions relative to the flash apparatus. In the transportation position, the cable is in its storage compartment or cavity, and the mounting rail or bar is in a position which serves as a cover or closure for the storage cavity. The cable is permanently connected to the flash apparatus at one end. Thus it cannot be accidentally left behind. The entire cable, including the free end having the plug device, is in a protected position within the storage compartment or cavity, during transportation, thus avoiding the possibility of damaging the plug. When the flash apparatus is to be used, the pivoted mounting bar is shifted from the position in which it overlies and forms a cover for the storage compartment, to one or another of its other positions, in which it may be attached by a conventional screw to the body of the associated camera, to serve as a bracket for holding the flash apparatus in fixed position relative to the camera.

Latching mechanism is provided, for latching the pivoted mounting bar in any one of three positions relative to the flash apparatus, that is, a first position in which the bar serves as a cover for the storage cavity, a second position in which the bar is at 90° to the length of the flash apparatus, which is the normal position of use if the associated camera (for example, a 35mm camera) is held in normal picture taking position, and a third position of the mounting bar, in which the bar is at 180° to the main axis of the body of the flash appliance, this being the position of use of the flash appliance if the camera is held on its side, as when the longer dimension of the photograph is to be vertical rather than horizontal. The latch mechanism is conveniently in the form of a notched block spring pressed toward a latching position, and manually movable to a released position by finger pressure exerted against a protruding plunger.

BRIEF DESCRIPTION OF THE DRAWINGS

FIG. 1 is a side elevation of flash apparatus in accordance with a preferred embodiment of the invention, with the mounting bar or rail folded to the transportation position, where it serves as a cover for the cable storage space;

FIG. 2 is a similar view with the mounting bar swung to a different position, exposing the cable storage space;

FIG. 3 is a front elevation of the apparatus, showing the mounting bar in solid lines in a mounting position serving as a bracket for the flash appliance, and showing in broken lines another mounting position and the closure or transportation position of the mounting bar;

FIG. 4 is a bottom view of the apparatus shown in FIG. 3, with the mounting bar in its closure or transportation position;

DESCRIPTION OF THE PREFERRED EMBODIMENT

Figure 5:
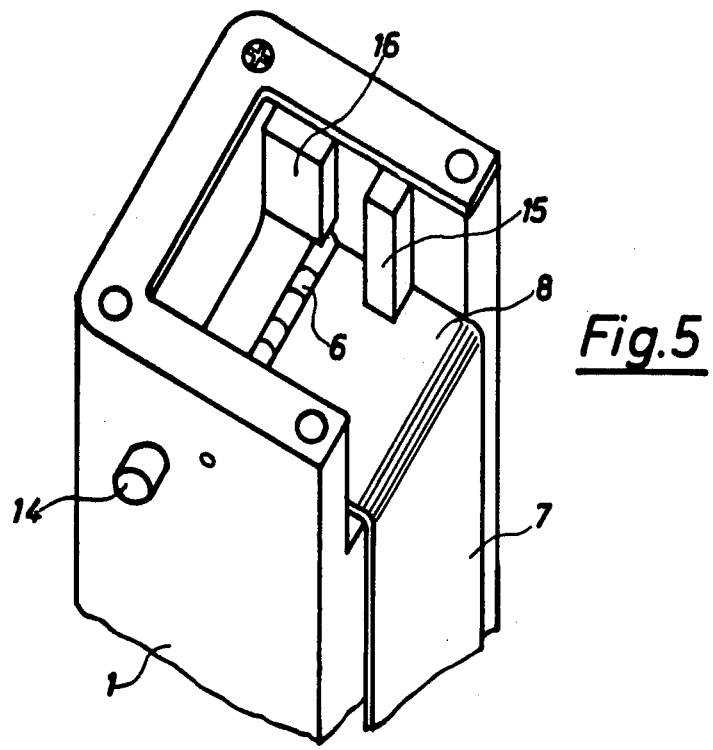
FIG. 5 is a perspective view of the lower part of the flash apparatus, illustrating particularly the hinge connection of the mounting bar to the flash body, and the latching mechanism.

The present invention, in its preferred form, comprises an elongated body 1 which serves in the conventional way as a handle for the flash appliance when it is held by hand, the upper part having a flash head 2 containing a conventional flash tube and reflector. The details of construction of the flash head may be varied widely, the present invention not being dependent upon any particular details of the head. Conveniently and preferably, however, the head is so designed that the tube and reflector containing portion of the head may be tilted upwardly so the light is directed toward the ceiling, to provide what is called "bounce" illumination of the subject being photographed. Such apparatus is disclosed, for example, in Prochnow U.S. Pat. No. 3,869,604, granted Mar. 4, 1975.

On one side of the body 1 is a cavity or space 3 serving as a compartment for storage of the cable 4, one end of which is permanently attached to the flash device and the other end of which carries the usual conventional plug 5 adapted to mate with the usual conventional socket in the camera with which the flash device is to be used. As well understood in the art, this cable, when plugged into the camera, serves to synchronize the flash of the flash apparatus with the opening of the shutter of the camera. When it is desired to use the flash apparatus, the cord or cable 4 is drawn out of the storage compartment 3, in which it lies merely loosely, and is attached in the conventional way to the camera.

Near the lower end of the body 1 there is a pivot spindle or shaft 6, on which is pivotally mounted the element 7, which may be described as a mounting bar or rail or arm. The end 8 of this mounting member, that is, the end which is pivotally mounted on the spindle 7, is at a right angle to the main length of the bar, as plainly seen in FIG. 3.

When the angled or offset end 8 of the mounting member 7 is of the proportions shown in FIG. 3, with respect to the location of the pivotal axis 6, the mounting bar 7 can be swung upwardly from the full line position shown in FIG. 3 to the upper one of the positions illustrated in dot-dash lines, and will then lie snugly against the side of the body 1, serving as a cover or closure for the storage cavity or compartment 3. It is preferred, however, to make the angular end 8 a trifle shorter than the length illustrated in FIG. 3, so that when the mounting bar is swung up to the carrying or transportation position, it will fit partly into the cavity 3 and the outer surface of the bar will be approximately flush with the surface of the body 1. To facilitate this, the lateral and top edges of the cavity 3 are provided with a shoulder or rabbet 9 into which the edge of the member 7 fits snugly, thus making a tighter joint having greater efficiency in excluding dust or other foreign matter from the storage compartment. If the parts are made in this preferred way, then only the head 10 of knurled screw 11 projects from the side wall of the body 1 when the parts are in the carrying or closed position. This screw 11 serves, when the mounting bar 7 is unfolded from the closed position, for securing the mounting arm 7 to the camera, by means of the usual screw socket conventionally provided on the camera, usually on the bottom thereof.

It is preferable to be able to mount the flash device in two different positions relative to the camera, so that it is desirable to be able to swing the mounting arm 7 to two mounting positions relative to the body 1 of the flash device, in addition to the folded or transporting position. It is well understood in the art that a small camera of the kind conventionally known as a 35mm camera (that is, a camera using a film strip having a width of 35mm) normally takes pictures which are rectangular rather than square, having for example an exposure area of 24 × 36 millimeters. When a conventional camera is held in the normal upright manner, the 36mm dimension of the exposure area is horizontal and the 24mm dimension is vertical. When the pictures are to be taken in this customary way, the mounting arm 7 of the flash apparatus is placed in the laterally extending position shown in full lines in FIG. 3, the length of the arm 7 being substantially 90° to the main axis or length of the body 1 of the flash device. Then the screw 11 is screwed into the socket in the bottom of the camera, the synchronizer cable 4 is removed from the storage compartment 3 and the plug 5 thereof is plugged into the synchronizer socket of the camera (the other end of the cable 4 remaining permanently attached to the flash device) and the equipment is ready for taking flash photographs. If it is desired to use "bounce" light from the ceiling, rather than direct flash illumination onto the subject being photographed, the front part of the flash head 2 can be tilted upwardly as illustrated, for example, in FIG. 2 of the above mentioned U.S. Pat. No. 3,869,604.

However, the photographer may desire to hold the camera sideways relative to the usual position, so that the long dimension of the exposure area will be vertical and the short dimension will be horizontal. With the mounting arm in the full line position illustrated in FIG. 3, the equipment could still be used with the camera held on its side, when it is desired to have direct illumination of the subject from the flash appliance. However, this position would not be suitable if bounce illumination is desired, because tilting the flash head would simply cause the light to be directed obliquely to the side horizontally, rather than being directed obliquely upwardly toward the ceiling. For this reason, it is desirable to have a second available position for the mounting arm 7, that is, a position in which the length of the mounting arm extends at 180° rather than 90° to the length or main axis of the handle portion 1 of the flash apparatus. The pivotal mounting of the arm 7 on the spindle or axle 6, in accordance with the present invention, provides this second position for the mounting arm, as illustrated in dash-dot lines extending downwardly from the bottom of the flash device, as seen in FIG. 3.

It is possible to keep the mounting arm 7 in one or another of its positions relative to the body 1, merely by using a tight frictional joint at the hinge 6. It is much more reliable, however, and therefore preferable, to have latching means which definitely latches the bar 7 in the selected one of its positions, and holds it immovably in that position, until the latching means is released.

Figure 6:
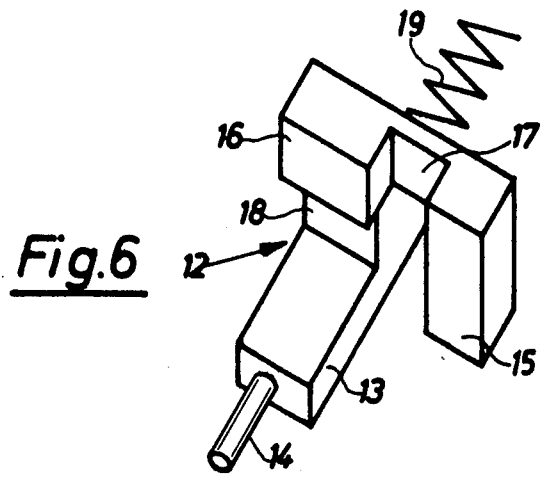
FIG. 6 is a perspective view of a detail of the latching mechanism.

To this end, a recess is provided in the bottom of the main body portion or handle portion 1 of the flash device, this recess being best seen in FIG. 5. Movably mounted in this recess is a latching body indicated in general at 12 (FIG. 6) mounted in the body 1 in such a way that the latching body 12 can move only in a direction parallel to the hinge axis 6 and is held against movement in all other directions. This latching body 12 has various notches which engage over the edge of the mounting arm or bar 7, 8 to hold it against swinging on its pivot 6.

For example, the latching body or block 12 has a base portion 13 from which an operating plunger or actuating part 14 extends, passing slidably through a hole in a side wall of the body 1. The block 12 also has two stud-like projections 15 and 16 having between them a recess or notch 17, and there is another notch or recess 18 between the part 16 and the part 13. A coiled compression spring 19 tends to move the body 12 in a direction to cause one or the other of the notches 17 and 18 to embrace the edge of the mounting bar 7, 8, depending upon the position of orientation of the mounting rail 7, 8.

When the mounting bar 7 is folded against the side of the body 1, in the position shown in FIG. 5, the lug or flange 15 overlies the portion 8 of the mounting bar, thus preventing the mounting bar from swinging on its pivot 6 and holding it firmly in the closed or carrying position. Finger pressure on the plunger 14 moves the latching block 12 against the force of the spring 19, to a position where the lug 15 no longer overlies the part 8 of the mounting bar 7. Then the mounting bar can be swung on its pivot 6. When it has been swung through an arc of 90° from the initial folded position, the latching block will snap back under the influence of the spring 19 (assuming that finger pressure on the plunger 14 has meanwhile been released) and the edge of the portion 8 of the mounting arm will be embraced in the notch 17 between the lug portion 15 and 16. This will hold the mounting arm securely in the 90° position. If the plunger is again pressed to release the latch, and the mounting arm 7 is swung further, it will reach its extreme or 180° position (bottom position shown in FIG. 3) and then the surface of the lug portion 16 of the latching block will overlie the surface of the portion 8 of the mounting arm, securely holding the mounting arm in this 180° position. Of course additional notches could be provided in the latching block, if it is desired to be able to latch the mounting bar in intermediate positions, but this is ordinarily unnecessary, as the folded position, the 90° position, and the 180° position are quite sufficient in most cases. An intermediate position such as a 45° position might possibly be desired for "trick" photographic shots, as for example if one wished to tilt the camera at 45° and take a photograph by bounce lighting.

The ability to latch the mounting bar in a position along side the body 1 of the flash device, not only has the advantage of providing a convenient cover for the storage compartment of the cable or cord, but also has the advantage of promoting the esthetic impression or appearance of the flash apparatus when it is not in use, and prevents the possibility of anything becoming hooked to or caught on a mounting arm which projects permanently in fixed position from the side of the flash unit.

The latching and unlatching arrangement permits the flash apparatus to be swung to various positions relative to the mounting arm 7, after the mounting arm has been fixed to the camera body by the screw 11. Thus, when taking a series of pictures, if the photographer wishes to shift from the horizontally elongated picture format to the vertically elongated picture format, it is not necessary for the photographer to disconnect the flash apparatus from the camera in order to make the change. The mounting arm or bracket 7 remains firmly attached to the camera by means of the screw 11, and the photographer merely presses the unlatching plunger 14 and swings the flash apparatus from the 90° position where the edge of the mounting arm is held in the notch 17, to the 180° position where the edge of the mounting arm is held in the notch 18, or vice versa. The latching mechanism of the present invention is particularly simple, and easy and inexpensive to manufacture and assemble.

What is claimed is:

1. Photographic flash apparatus comprising a body portion, a synchronous connection cable for electrical connection with a camera with which the flash apparatus is used, and a mounting arm pivotally attached to said body portion for supporting said body portion from said camera, characterized by the fact that:
    a. said body portion has a cavity serving as a storage compartment for said cable when not in use;
    b. one end of said cable is connected to said body portion within said cavity;
    c. said mounting arm is arranged for swinging movement to a plurality of positions of orientation relative to said body portion; and
    d. in one of said positions, said mounting arm overlies and serves as a closure for said storage cavity.

2. Apparatus as defined in claim 1, wherein
    a. said storage cavity has an entrance opening lying approximately in a plane;
    b. said mounting arm has a main portion and an end portion at an angle to said main portion;
    c. said end portion of said mounting arm is pivotally attached to said body portion for swinging movement about a pivotal axis offset from and substantially parallel to said plane; and
    d. said pivotal axis is so placed relative to the location of said plane and the dimensions of said mounting arm, that said mounting may swing on said axis to a position wherein said main portion of said arm lies approximately in said plane and serves as a closure for said cavity.

3. Apparatus as defined in claim 1, further comprising latching means for latching said mounting arm in any selected one of said plurality of positions of orientation relative to said body portion.

4. Apparatus as defined in claim 3, wherein said mounting arm swings about a pivotal axis, and said latching means comprises a latching body displaceable in the direction of said pivotal axis between a released position in which said arm is free to swing on its pivotal axis and a latching position in which projections on said latching body engage said mounting arm to restrain swinging movement thereof.

5. Apparatus as defined in claim 4, further comprising spring means tending to move said latching body from its said released position toward its said latching position.

6. Apparatus as defined in claim 5, wherein said latching body and said spring means are located mainly within said body portion of the apparatus, and wherein said latching body has an actuating member protruding from said body portion of the apparatus to an accessible position so that the actuating member may be manually moved to shift said latching body from its latching position to its released position against the force of said spring means.

7. Apparatus as defined in claim 1, wherein said cavity has an edge formed with a rabbet into which said mounting arm fits when said mounting arm is in its closure position.

8. Apparatus as defined in claim 3 wherein said plurality of positions comprises three positions spaced about 90° from each other.

9. Apparatus as defined in claim 8, wherein said mounting arm swings about a pivotal axis, and said latching means comprises a latching body displaceable in the direction of said pivotal axis between a released position in which said arm is free to swing on its pivotal axis and a latching position in which projections on said latching body engage said mounting arm to restrain swinging movement thereof.

10. Apparatus as defined in claim 9, further comprising spring means tending to move said latching body from its said released position toward its said latching position.

* * * * *